US012587744B2

(12) United States Patent
Brown et al.

(10) Patent No.: US 12,587,744 B2
(45) Date of Patent: Mar. 24, 2026

(54) ACTUATOR ASSEMBLY WITH BEARING ARRANGEMENT AND ELECTRICAL INTERCONNECTOR

(71) Applicant: CAMBRIDGE MECHATRONICS LIMITED, Cambridge (GB)

(72) Inventors: Andrew Benjamin Simpson Brown, Cambridge (GB); Robin Eddington, Cambridge (GB); Robert Langhorne, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 121 days.

(21) Appl. No.: 18/294,424

(22) PCT Filed: Aug. 2, 2022

(86) PCT No.: PCT/GB2022/052034
§ 371 (c)(1),
(2) Date: Feb. 1, 2024

(87) PCT Pub. No.: WO2023/012472
PCT Pub. Date: Feb. 9, 2023

(65) Prior Publication Data
US 2025/0097577 A1 Mar. 20, 2025

(30) Foreign Application Priority Data

Aug. 2, 2021 (GB) .......................................... 2111136
Mar. 14, 2022 (GB) ........................................ 2203533

(51) Int. Cl.
*H04N 23/68* (2023.01)
*F03G 7/06* (2006.01)
(Continued)

(52) U.S. Cl.
CPC ....... *H04N 23/687* (2023.01); *F03G 7/06143* (2021.08); *H02N 10/00* (2013.01); *H04N 23/54* (2023.01)

(58) Field of Classification Search
CPC ...... H04N 23/687; H04N 23/54; H04N 23/57; F03G 7/06143; H02N 10/00; G02B 27/646
See application file for complete search history.

(56) References Cited

U.S. PATENT DOCUMENTS 12,003,855 B2 * 6/2024 Huang ................. H04N 23/687
12,149,830 B2 * 11/2024 Smyth ................... H04N 23/54
(Continued)

FOREIGN PATENT DOCUMENTS

EP 3817362 A1 5/2021

OTHER PUBLICATIONS

International Search Report and Written Opinion received for PCT Patent Application No. PCT/GB2022/052034, mailed on Oct. 27, 2022.
(Continued)

*Primary Examiner* — Padma Haliyur
(74) *Attorney, Agent, or Firm* — Van Hoven PC; Stefan D. Osterbur; Joshua Van Hoven

(57) ABSTRACT

An actuator assembly comprising: a support structure (4) comprising a first printed circuit board, PCB (10); an image sensor assembly (12) comprising a second PCB (9) and an image sensor (6) having a light-sensitive region (7), wherein the image sensor assembly (12) is supported on the support structure (4) to allow movement of the image sensor assembly (12) relative to the support structure (4); and an electrical interconnector (51) configured to electrically connect the first PCB (10) to the second PCB (9); wherein the first PCB (10) and the second PCB overlap (9) when viewed along at
(Continued)

least one direction in the plane in which the first PCB (10) extends.

20 Claims, 8 Drawing Sheets

(51) Int. Cl.
     *H02N 10/00*          (2006.01)
     *H04N 23/54*          (2023.01)

(56)                    References Cited

U.S. PATENT DOCUMENTS

2017/0219842  A1*   8/2017  Howarth ............. G02B 27/646
2018/0321503  A1*  11/2018  Brown .................... F03G 7/065
2019/0086686  A1*   3/2019  Lai ........................... G03B 5/02
2019/0369678  A1   12/2019  Park et al.
2021/0132406  A1*   5/2021  Li ............................ G02B 7/02
2021/0168289  A1    6/2021  Hubert et al.
2021/0223563  A1*   7/2021  Miller ................... H04N 23/57
2021/0239933  A1*   8/2021  Tseng .................... H04N 23/54
2023/0292008  A1    9/2023  Park
2023/0328348  A1*  10/2023  Pantelidis ............. H05K 1/147
                                                  348/208.11
2024/0244325  A1*   7/2024  Park ...................... H04N 23/60
2024/0397205  A1*  11/2024  Wang .................... H04N 23/54

OTHER PUBLICATIONS

Combined Search and Examination Report of GB Application No. GB2111136.4 dated Jul. 28, 2022.

\* cited by examiner

ACTUATOR ASSEMBLY WITH BEARING ARRANGEMENT AND ELECTRICAL INTERCONNECTOR

CROSS-REFERENCE TO RELATED APPLICATIONS

This application is a national stage application under 35 U.S.C. § 371 of International Application No. PCT/GB2022/052034, filed Aug. 2, 2022, which claims priority of GB Patent Application Nos. 2111136.4, filed Aug. 2, 2021 and 2203533.1, filed Mar. 14, 2022, the disclosures of each of which are hereby incorporated by reference herein in their entireties.

FIELD

The present invention relates to an actuator assembly, particularly an actuator assembly for enabling optical image stabilisation (OIS).

BACKGROUND

In a camera, the purpose of OIS is to compensate for camera shake, that is vibration of the camera, typically caused by user hand movement, that degrades the quality of the image captured by the image sensor. Mechanical OIS typically involves detecting the vibration by a vibration sensor such as a gyroscope sensor, and controlling, on the basis of the detected vibration, an actuator arrangement that adjusts the camera apparatus to compensate for the vibration.

A number of actuator arrangements employing mechanical OIS techniques are known and applied successfully in relatively large camera apparatuses, such as digital still cameras, but are difficult to miniaturise. Cameras have become very common in a wide range of portable electronic equipment, for example mobile telephones and tablet computers, and in many such applications miniaturisation of the camera is important. The very tight packaging of components in miniature camera apparatuses presents great difficulties in adding OIS actuators within the desired package.

WO-2017/072525 discloses an image sensor mounted on a carrier that is suspended on a support structure by a plain bearing that allows movement of the carrier and the image sensor relative to a support structure in any direction laterally to the light-sensitive region of the image sensor. An actuator assembly comprising plural SMA wires is arranged to move the carrier and the image sensor relative to the support structure for providing OIS of the image captured by the image sensor.

The image sensor can generate heat during use. If the image sensor gets too hot, then its performance may be impaired. If the maximum operating temperature of the image sensor is exceeded, then the image sensor may stop functioning correctly or may be forced to power down. The present invention is concerned, amongst other things, with an actuator assembly that reduces the possibility of the image sensor overheating.

SUMMARY

According to an aspect of the present invention, there is provided an actuator assembly comprising: a support structure comprising a first printed circuit board, PCB; an image sensor assembly comprising a second PCB and an image sensor having a light-sensitive region, wherein the image sensor assembly is supported on the support structure to allow movement of the image sensor assembly relative to the support structure; and an electrical interconnector configured to electrically connect the first PCB to the second PCB; wherein the first PCB and the second PCB overlap in a direction perpendicular to the plane in which the first PCB extends. The phrase 'the first PCB and the second PCB overlap in a direction perpendicular to the plane in which the first PCB extends' means, for example, that the first PCB and the second PCB overlap when projected onto an axis perpendicular to the plane in which the first PCB extends. Put differently, the first PCB and the second PCB overlap when viewed along at least one direction in the plane in which the first PCB extends.

By providing that the PCBs overlap in space in the direction of the primary axis of the actuator assembly, the PCBs can be electrically connected to each other without requiring the first PCB to fit into the gap between the second PCB and the support structure. This helps to reduce the distance between the image sensor and the support structure. As a result, the support structure can better act as a heat sink, dissipating heat away from the image sensor. This helps to reduce the possibility of the image sensor overheating. Additionally or alternatively, the height of the actuator assembly can be reduced.

The actuator assembly may also be used to move an electronic component other than an image sensor. Thus, according to another aspect of the present invention, there is provided an actuator assembly comprising: a support structure comprising a first PCB; an electronic assembly comprising a second PCB and an electronic component, wherein the electronic assembly is supported on the support structure to allow movement of the electronic assembly relative to the support structure; and an electrical interconnector configured to electrically connect the first PCB to the second PCB; wherein the first PCB and the second PCB overlap when viewed along at least one direction in the plane in which the first PCB extends.

BRIEF DESCRIPTION OF THE DRAWINGS

Certain embodiments of the present invention will now be described, by way of example only, with reference to the accompanying drawings in which.

DETAILED DESCRIPTION

Structure of Actuator Assembly

Figures 1, 2:
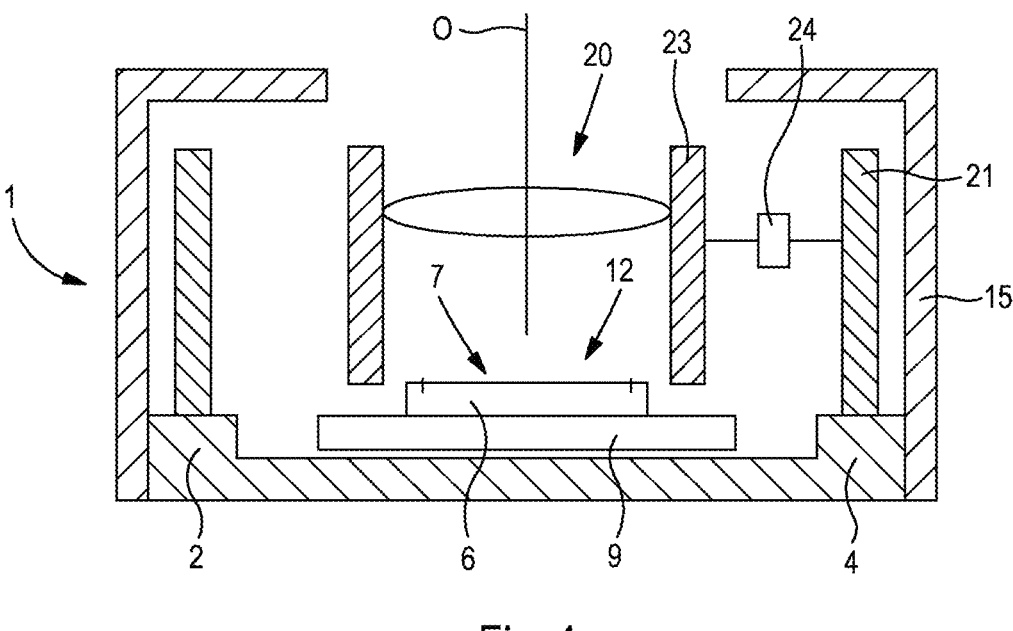
FIG. 1 is a schematic cross-sectional view of a camera apparatus including an actuator assembly.
FIG. 2 is a cross-sectional view of the actuator assembly comprising a roller bearing.

A camera apparatus 1 that incorporates an actuator assembly 2 in accordance with the present invention is shown in FIG. 1, which is a cross-sectional view taken along the optical axis O. In the depicted embodiment, the actuator assembly 2 is a sensor shift assembly. The camera apparatus 1 is to be incorporated in a portable electronic device such as a mobile telephone, or tablet computer. Thus, miniaturisation is an important design criterion.

Figure 3:
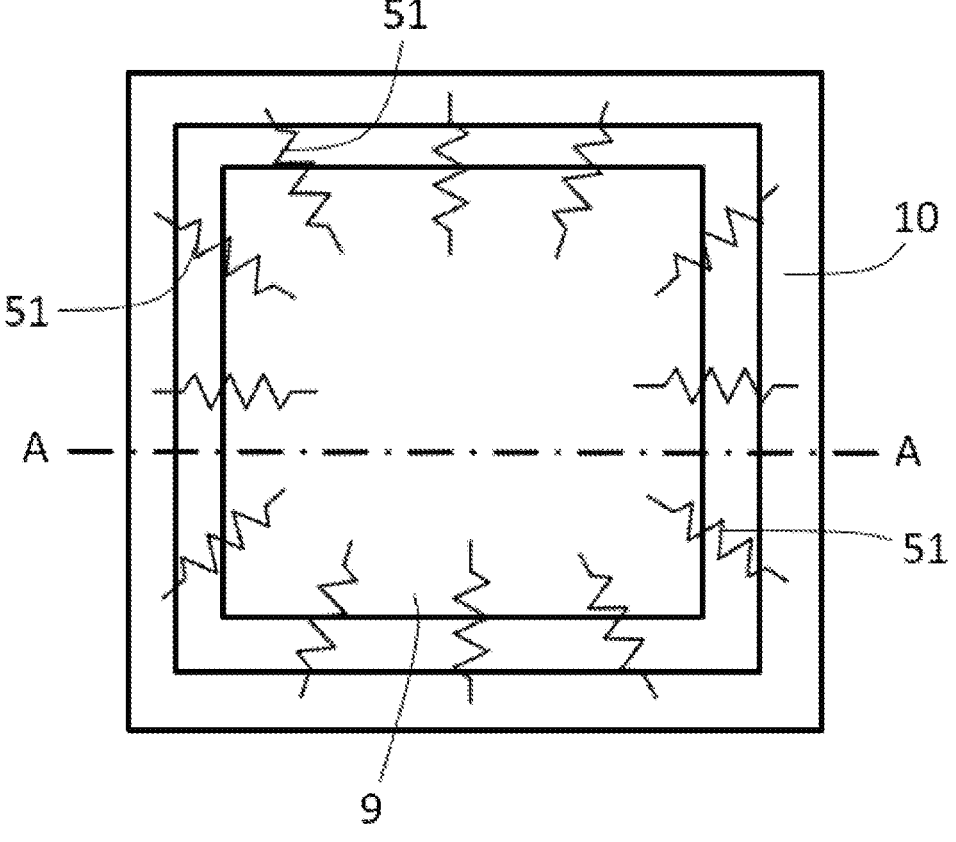
FIG. 3 is a plan view of the underside of the interconnected PCBs of the actuator assembly.
Figure 4:
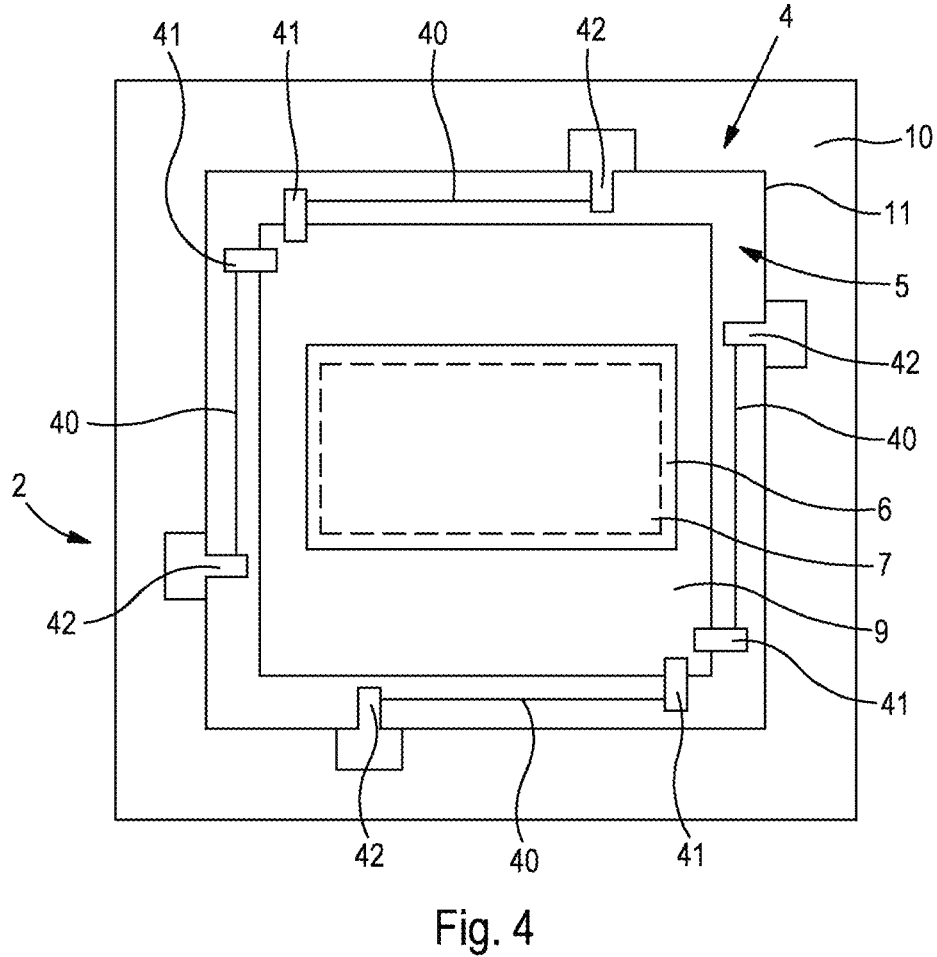
FIG. 4 is a plan view of the actuator assembly from above.

The actuator assembly 2 is shown in detail in FIGS. 2 to 4, FIG. 2 being a side view of the actuator assembly 2, FIG. 3 being an underside view of interconnected first and second PCBs 9, 10 of the actuator assembly 2; and FIG. 4 being a plan view of the actuator assembly 2. For clarity, FIGS. 2 and 4 omit the electrical interconnect 51 described below. The line A-A shown in FIG. 3 is the line along which the cross-sectional view shown in FIG. 2 is taken. This line does not intersect with the electrical interconnect 51. Accordingly, the electrical interconnect 51 is not shown in FIG. 2. The actuator assembly 2 may be manufactured first and then assembled with the other components of the camera apparatus 1.

The actuator assembly 2 comprises a support structure 4. The support structure 4 comprises a first printed circuit board (PCB) 10. On the support structure 4 is supported an image sensor assembly 12. The image sensor assembly 12 comprises an image sensor 6 having a light-sensitive region 7 and generally further comprises a second PCB 9. The image sensor 6 is fixed relative to the second PCB 9. For example, the image sensor 6 may be mounted on the second PCB 9. When incorporated into the camera apparatus 1, the light-sensitive region 7 is aligned with the optical axis O and perpendicular to the optical axis O. The image sensor 6 captures an image and may be of any suitable type, for example a CCD (charge-coupled device) or a CMOS (complementary metal-oxide-semiconductor) device. As is conventional, the image sensor 6 has a rectangular light-sensitive region 7. The light-sensitive region 7 may comprise an array of pixels. Without limitation to the invention, in this example the camera apparatus 1 is a miniature camera in which the light-sensitive region 7 has a diagonal length of at most 20 mm.

Optionally, the electrical connection between the image sensor 6 and the electrical interconnector 51 is at least partly formed by the second PCB 9. The second PCB is for transferring signals such as data signals and power signals between the image sensor 6 and the first PCB 10. Additionally, the second PCB 9 may comprise electronic components configured to act on signals output by the image sensor 6. For example, the second PCB 9 may comprise electrical components such as capacitors. It can be desirable to reduce as much as possible the distance between the image sensor 6 and such electronic components in which case it is desirable to provide such electronic components in the second PCB 9 rather than in the first PCB 10. The distance between the image sensor 6 and the second PCB 9 is smaller than the distance between the image sensor 6 and the first PCB 10.

The first PCB 10 is configured to collect the signals from the second PCB 9, and to provide signals to the second PCB 9. The first PCB 10 facilitates collection of signals for connection to an external device (e.g. a mobile phone).

Optionally, the second PCB 9 of the image sensor assembly 12 functions as a moving plate. The image sensor 6 may be mounted on the moving plate.

Although the moving plate may comprise only the second PCB 9, optionally the moving plate may comprise other layers which may be attached to or laminated with the second PCB 9.

Optionally, the support structure 4 comprises a support plate 5 which may be formed from sheet material, which may be a metal for example steel such as stainless steel or copper or a copper alloy.

Although the support structure 4 comprises a single support plate 5 in this example, optionally the support structure 4 may comprise other layers which may be attached to or laminated with the support plate 5.

The support structure 4 further comprises the first PCB 10 which may form a rim portion. The first PCB 10 may be fixed to the front side of the support plate 5 and extend at least partly around the support plate 5. The first PCB 10 may have a central aperture 11.

The camera apparatus 1, and/or the portable electronic device in which the camera apparatus 1 is integrated, comprises an integrated circuit (IC) chip 30 and a gyroscope sensor 31 which, in the illustrated example, are fixed on the rear side of the support plate 5. Control circuitry described further below is implemented in the IC chip 30.

The image sensor assembly 12 is supported on the support structure 4 in a manner allowing movement of the image sensor assembly 12 relative to the support structure 4 in any direction laterally to the light-sensitive region 7 (i.e. laterally of the optical axis O and parallel to the plane in which the light-sensitive region 7 extends). So, the image sensor assembly 12 may be supported in a manner suppressing movement of the image sensor assembly 12 in a direction perpendicular to the light-sensitive region 7. The image sensor assembly 12 is further supported on the support structure 4 in a manner allowing rotation of the image sensor assembly 12 about any axis parallel to the optical axis O (i.e. parallel to any axis orthogonal to the plane in which the light-sensitive region extends). So, the image sensor assembly 12 may be supported in a manner suppressing tilt or rotation of the image sensor assembly 12 about any axis parallel to the light-sensitive region 7.

WO-2017/072525 discloses use of a plain bearing for supporting an image sensor assembly on a support structure in a manner allowing the above-described movement. Such a plain bearing comprises two bearing surfaces that bear on each other, permitting relative sliding motion. Such a plain bearing may be compact and facilitate heat transfer between the image sensor assembly and the support structure. However, in certain applications it may be desirable to reduce friction between the image sensor assembly and the support structure compared to an arrangement in which a plain bearing is provided.

In the illustrated embodiments, the image sensor assembly 12 is supported on the support structure 4 by a bearing arrangement 110 (described below) such that a gap 104 is formed between the image sensor assembly 12 and the support structure 4. The gap 104 is formed on a side of the image sensor assembly 12 facing away from the light-sensitive region 7, in particular in a direction perpendicular to the light-sensitive region 7. The gap 104 is formed, in particular, between the image sensor assembly 12 and the support plate 5.

Interconnect

FIG. 3 is a plan view of the underside of the first PCB 10 and the second PCB 9. FIG. 3 may be an underside view of the actuator assembly 2 shown in FIG. 2 (or FIG. 5, FIG. 7 or FIG. 9) with the support plate 5 and the bearing arrangement 110 removed.

As shown in FIG. 3, the actuator assembly 2 comprises an electrical interconnector 51. The electrical interconnector 51 is configured to electrically connect the first PCB 10 to the second PCB 9. The electrical interconnector 51 may be configured to transfer data between the first PCB 10 and the second PCB 9. For example, image data acquired by the image sensor 6 may be transferred from the second PCB 9 to the first PCB 10 via the electrical interconnector 51. The electrical interconnector 51 may be configured to supply power for the image sensor 6 from the first PCB 10 to the second PCB 9. In general, the electrical interconnector 51 is configured to transfer electrical signals such as power and data in either direction between the first PCB 10 and the second PCB 9. The electrical interconnector 51 may also be configured to transfer (or provide a common return path for) signals for driving the SMA wires 40 from the first PCB 10 to the second PCB 9.

As shown in FIG. 3, optionally the electrical interconnector 51 comprises a plurality of metallic flexures. The electrical interconnector 51 may comprise a plurality of groups of flexures. Each group of flexures is generally for providing electrical connection between the second PCB 9 and a respective side of the first PCB 10. The number of flexures in each group may be one, two, three, four, five, six or more. Although not shown in FIG. 3, optionally the flexures within a given group are arranged at the same orientation as each other. For example, the flexures within a group may be parallel to each other. The number of groups of flexures may be one, two, three, four, or more than four. For example, as described below, with reference to FIG. 6, in an alternative arrangement the first PCB 10 may extend around only two sides of the second PCB 9. In such an arrangement, there may be only two groups of flexures in the electrical interconnector 51.

Optionally, the flexures of the electrical interconnector 51 generally extend in a plane parallel to the plane in which the first PCB 10 extends. The flexures may generally extend in a plane perpendicular to the primary axis of the actuator assembly 2. The primary axis of the actuator assembly 2 is perpendicular to the plane in which the support plate 5 extends. The primary axis is perpendicular to the plane in which the light-sensitive regions 7 of the image sensor 6 extends when the image sensor 6 is in its neutral (i.e. untitled) position relative to the support structure 4. The primary axis may correspond to the optical axis O shown in FIG. 1.

The electrical interconnector 51 may be configured to flex when the second PCB 9 moves relative to the first PCB 10. The electrical connection between the first PCB 10 and the second PCB 9 is maintained during movement of the second PCB 9 relative to the first PCB 10. For example, the flexures of the electrical interconnector 51 may flex in the plane parallel to the plane in which the first PCB 10 extends, i.e. in the plane perpendicular to the primary axis of the actuator assembly 2. As shown in FIG. 3, each flexure of the electrical interconnector 51 may comprise at least one bend. The bend is configured to facilitate flexing of the flexures during relative movement between the first PCB 10 and the second PCB 9. Although not shown in FIG. 3, optionally each flexure may comprise only one bend. Each flexure may form an L-shape.

Optionally, the flexures of the electrical interconnector 51 remain essentially in the plane perpendicular to the primary axis during movement of the second PCB 9 relative to the first PCB 10. Alternatively, the electrical interconnector 51 may flex at least partly in a direction parallel to the primary axis. The electrical interconnector 51 may extend into the gap 104 towards the support plate 5.

There is a possibility that the electrical interconnector 51 may come in to contact with the support plate 5 during movement of the image sensor assembly 12 relative to the support structure 4. Optionally, the support structure 4 comprises an electrically insulating surface facing the gap 104. For example, the upper surface of the support plate 5 may be electrically insulating. The support plate 5 may comprise an electrically insulating coating at its side facing the image sensor assembly 12. The electrically insulating surface can reduce the possibility of an undesirable electrical connection being formed between the electrical interconnector 51 and the support plate 5. This reduces the possibility of an undesirable short circuit occurring.

As shown in FIG. 2, for example, optionally the electrical interconnector 51 is located in the gap 104. For example, the electrical interconnector 51 may be attached to the sides (also referred to as the undersides) of the first and second PCBs 9, 10 facing the gap 104. This can help to reduce the extent of the actuator assembly 2 in the direction of the primary axis.

In an alternative arrangement, the electrical interconnector 51 is provided on the side of the first PCB 10 and/or the second PCB 9 facing away from the gap 104. For example, the electrical interconnector 51 may be attached to the lower side of the first PCB and the upper side of the second PCB 9. The electrical interconnector 51 may alternatively be attached to the upper side of the first PCB 10 and the lower side of the second PCB 9. Alternatively, the electrical interconnector 51 may be attached to the upper side of the first PCB 10 and the upper side of the second PCB 9.

Reduction of Thermal Path

As shown in FIG. 2, optionally the first PCB 10 and the second PCB 9 overlap in the direction perpendicular to the plane in which the first PCB 10 extends (i.e. overlap when viewed along at least one direction in the plane in which the first PCB 10 extends). In FIG. 2, the plane in which the first PCB 10 extends is drawn as horizontal. The direction perpendicular to the plane in which the first PCB 10 extends is drawn as vertical.

The image sensor can generate heat during use. If the image sensor gets too hot, then its performance may be impaired. If the maximum operating temperature of the image sensor is exceeded, then the image sensor may stop functioning correctly or may be forced to power down. The present invention is concerned, amongst other things, with an actuator assembly that reduces the possibility of the image sensor overheating.

Providing that the PCBs overlap in space in the direction of the primary axis of the actuator assembly, can help to reduce the distance between the image sensor and the support structure. As a result, the support structure can better act as a heat sink, dissipating heat away from the image sensor. This helps to reduce the possibility of the image sensor overheating.

As shown in FIG. 2, optionally the first PCB 10 and the second PCB 9 are in substantially the same plane. The upper surface of the second PCB 9 may be parallel with the upper surface of the first PCB 10. Alternatively, there may be an offset between the positions of the first PCB 10 and the second PCB 9 in the direction of the primary axis. At least part of the second PCB 9 overlaps the first PCB 10. One or both of the major surfaces (i.e. the upper side or the lower side) of the second PCB 9 is in the same plane perpendicular to the primary axis as part of the first PCB 10. The first PCB 10 and the second PCB 9 are positioned relative to each other such that if the second PCB 9 were moved too far in at least one direction perpendicular to the primary axis, then the second PCB 9 would collide with the first PCB 10.

Optionally, the length of overlap between the first PCB 10 and the second PCB 9 is at least half the thickness of the first PCB 10 and/or the second PCB 9 in the direction perpendicular to the plane in which the first PCB 10 extends. An example is shown in FIG. 2, where the length of overlap corresponds to the whole of the thickness of the second PCB 9. Optionally, the second PCB 9 and the first PCB 10 may have substantially the same thickness. Alternative, as shown in FIG. 2 the second PCB 9 may be thinner than the first PCB 10. In a further alternative, the second PCB 9 may be thicker than the first PCB 10. The length of overlap may be the whole of the thickness of one or both of the first PCB 10 and the second PCB 9.

The present invention can enable the image sensor 6 to be positioned closer to the support plate 5 of the actuator assembly 2. The thermal path between the image sensor 6 and the support structure 4 (substantially) bypasses the first PCB 10. In the arrangement shown in FIG. 2 the thermal path consists of the second PCB 9 and the gap 104 between the image sensor 6 and the support plate 5 of the support structure 4. By reducing the thermal path, it is possible to reduce the steady-state temperature of the image sensor 6. The likelihood that the camera apparatus 1 would need to power down due to overheating can therefore be reduced. The overall height of the actuator assembly 2 can also be reduced.

As shown in FIG. 2, optionally the gap 104 is formed directly between the image sensor assembly 12 (e.g. the second PCB 9) and the support plate 5 of the support structure 4. The support plate 5 may have a substantially planar upper surface facing the imager sensor assembly 12. The upper surface of the support plate 5 is planar across a plane including the full extent of the image sensor assembly 12 in the direction perpendicular to the primary axis. No additional component is provided between image sensor assembly 12 and the support plate 5.

Optionally, the gap 104 extends, in the direction perpendicular to the plane in which the first PCB 10 extends, by a distance of at least 10 μm. By providing that the gap is at least 10 μm, friction that may otherwise inhibit movement of the image sensor assembly 12 relative to the support structure 4 is avoided. Optionally, the gap extends by a distance of at least 20 μm. By providing that the gap is at least 20 μm, the possibility of the electrical interconnector 51 contacting and causing undesirable friction against the support plate 5 is reduced. Optionally, the gap extends by a distance of at most 200 μm. By providing a smaller gap 104, the thermal path between the image sensor 6 and the support structure 4 that acts as a heatsink is reduced. This improves dissipation of heat away from the image sensor 6, thereby reducing the possibility of the image sensor 6 overheating. Optionally, the gap 104 extends by a distance of at most 100 μm. In an example, the gap 104 extends by a distance of about 50 μm.

Figure 5:
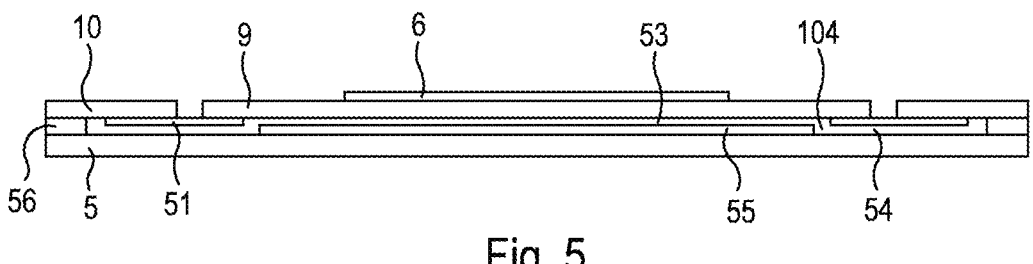
FIG. 5 is a cross-sectional view of an alternative arrangement of an actuator assembly.

FIG. 5 is a cross-sectional view of an alternative arrangement of actuator assembly 2. FIG. 5 is a cross-sectional view taken along a line that includes the electrical interconnect 52 but does not include the bearing arrangement 110. Accordingly, the bearing arrangement 110 is not shown in FIG. 5. The arrangement shown in FIG. 5 is different from the arrangement shown in FIG. 2. Features that are in common with the actuator assembly 2 described above are not repeated below in order to avoid redundancy of description.

As shown in FIG. 2, optionally the first PCB 10 is mounted directly on to the support plate 5. The second PCB 9 is thinner than the first PCB 10. This allows the upper surfaces of the first PCB 10 and the second PCB 9 to be in the same plane, while allowing for the gap 104 between image sensor assembly 12 and the support plate 5.

In the alternative arrangement shown in FIG. 5, a supporting wall 56 is provided. The supporting wall 56 mechanically connects the first PCB 10 to the support plate 5. The supporting wall 56 is configured to elevate the first PCB 10 above the support plate 5. This allows the first PCB 10 to have substantially the same thickness as the second PCB 9 while maintaining the gap 104 between the image sensor assembly 12 and the support plate 5 of the support structure 4. The maximum thickness of the gap 104 may correspond to the thickness (in the direction parallel to the primary axis) of the supporting wall 56. The support plate 5 may be a planar sheet, for example a steel (e.g. stainless steel) sheet. Alternatively, the supporting wall 56 may be formed integrally with the support plate 5. For example, the shape of the supporting wall 56 on a flat plate may be formed by etching (or coining or otherwise machining) a sheet of material.

As shown in FIG. 5, optionally the depth of the gap 104 varies across the lateral extent of the image sensor assembly 12. As shown in FIG. 5, the gap 104 may extend by a smaller distance in a central region 53 than in a peripheral region 54. The central region 53 is a region of the gap 104 directly between the image sensor 6 and the support structure 4. The central region 53 is directly below the image sensor 6. The peripheral region 54 is a region of the gap 104 adjacent to where the electrical interconnector 51 is located. The peripheral region 54 is directly below the electrical interconnector 51.

By reducing the extent of the gap 104 in the direction parallel to the primary axis, the thermal path between the image sensor 6 and the support structure 4 is desirably reduced. However, it is desirable to allow space for the electrical interconnector 51 (and for the flexing thereof) without the electrical interconnector 51 creating friction with the support plate 5 or forming an electrical connection with the support plate 5. By providing a narrower gap 104 in the central region 53, the thermal path from the image sensor 6 is desirably reduced, while allowing space in the peripheral region 54 for (the flexing of) the electrical interconnector 51.

As shown in FIG. 5, optionally a region of material 55 is fixed relative to the support structure 4. The region of material 55 is located between the image sensor 6 and the support plate 5. The region of material 55 is provided on the side of the support plate 5 facing towards the image sensor assembly 12. The region of material 55 is configured to reduce the thermal path between the image sensor externally support structure 4. The region of material 55 may extend over the full lateral extent of the image sensor 6. Alternatively, the region of material 5 may extend only partially across the lateral extent of the image sensor 6.

The region of material 55 forms part of the support structure 4. The region of material 55 reduces the gap 104 in the central region 53 below the image sensor 6. The region of material 55 has greater thermal conductivity than the gas (e.g. air) which fills the gap 104.

The region of material 55 may be initially provided as a separate component from the support plate 5 that is subsequently fixed to the support plate 5. In an alternative arrangement, the support plate 5 may be shaped such that its upper surface comprises a protrusion below the central region 53. The region of material 55 may be formed integrally as part of the support plate 5. Such a shaped support plate 5 may be formed, for example by etching or coining where the support plate 5 is to face the peripheral region 54.

Figure 7:
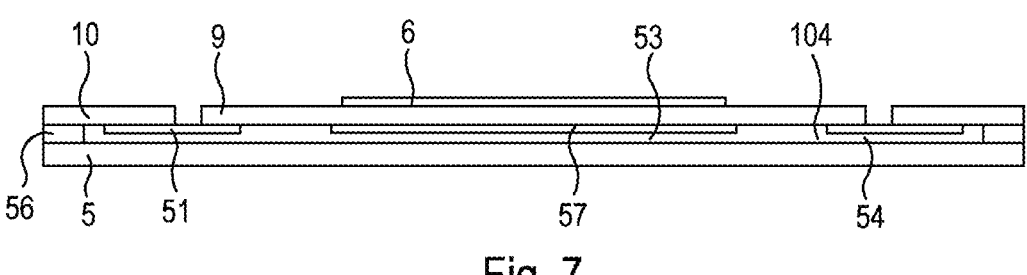
FIG. 7 is a cross-sectional view of a further alternative arrangement of an actuator assembly.

FIG. 7 is a cross-sectional view of an alternative arrangement for the actuator assembly 2. As shown in FIG. 7, optionally the image sensor assembly 12 comprises a region of material 57. The region of material 57 is on the side of the image sensor assembly 12 facing away from the light-sensitive region 7. The region of material 57 is configured to reduce the extent of the gap 104 in the central region 53. The region of material 57 is located between the image sensor 6 and the support structure 4. The region of material 57 may extend over the full lateral extent of the image sensor 6. Alternatively, the region of material 57 may extend only partially across the lateral extent of the image sensor 6. The region of material 57 is configured to reduce the thermal path between the image sensor 6 and the support structure 4. The region of material 57 is formed of a material that has a higher thermal conductivity than the gas that otherwise fills the gap 104. As shown in FIG. 7, optionally the region of material 54 is fixed relative to the second PCB 9. Alternatively, such a region of material may be provided fixed to a sensor support number 58 (see FIG. 9) in arrangements in which the second PCB 9 is not directly between the image sensor 6 and the gap 104.

Optionally, the electrical interconnector 51 is formed from a sheet of metal. For example, the flexures of the electrical interconnector 51 may be etched (or alternatively cut, stamped, punched or otherwise machined) from a sheet of metal. Optionally, the region of material 57 may be derived from the same sheet of metal from which the electrical interconnector 51 is formed. The electrical interconnector 51 may be formed from a metal such as copper or beryllium copper. The region of material 57 may comprise a metal such as copper, beryllium copper or steel (e.g. stainless steel).

As shown in FIGS. 2, 5 and 7, for example, optionally the image sensor 6 is mounted on the second PCB 9. For example, wire bonds are provided to provide electrical connections between the image sensor 6 and the second PCB 9. The second PCB 9 may have a simple structure. For example, the second PCB 9 may have a square or rectangular shape. The second PCB 9 may be continuous, meaning that it does not have any apertures formed in it.

Figure 9:
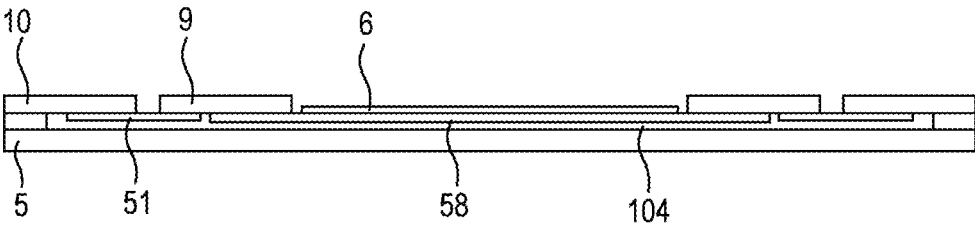
FIG. 9 is a cross-sectional view of another alternative arrangement of an actuator assembly.

FIG. 9 is a cross-sectional view of an alternative arrangement of the actuator assembly 2. As shown in FIG. 9, optionally the image sensor 6 and the second PCB 9 overlap in a direction perpendicular to the plane in which the light-sensitive region 7 extends. The image sensor 6 overlaps with the second PCB 9 along the primary axis of the actuator assembly 2. Optionally, the second PCB 9 has a hole in which the image sensor 6 is located. Alternatively, the second PCB 9 may be adjacent to the image sensor 6 (e.g. the second PCB 9 may form an L-shape or a U-shape adjacent to the image sensor 6).

By overlapping the image sensor 6 with the second PCB 9, the position of the image sensor 6 can be located closer to the support structure 4. This can help to reduce the overall height of the actuator assembly 2. This can help to improve heat transfer away from the image sensor 6. The thermal path between the image sensor 6 and the support structure 4 may be reduced. The thermal path may (substantially) bypass the second PCB 9. By overlapping the image sensor 6 with the second PCB 9, the overall height of the actuator assembly 2 can be desirably reduced.

As shown in FIG. 9, optionally the image sensor 6 is mounted on a sensor support member 58. The sensor support member 58 may be essentially planar, for example it may be a plate. The sensor support member 58 may be a metal for example steel (e.g. stainless steel) or copper or beryllium copper. Optionally, the second PCB 9 is mounted on the sensor support member 58.

The image sensor 6 is fixed relative to the second PCB 9. The image sensor 6 is electrically connected to the second PCB 9. For example, wire bonds may provide electrical connection between the image sensor 6 and the second PCB 9. Optionally, the lower surfaces of the image sensor 6 and the second PCB 9 do not comprise any electrical connections. This allows the sensor support member 58 to comprise an electrically conductive material without undesirably forming further electrical connections between the image sensor 6 and the second PCB 9.

PCB Including Bend

Figure 10:
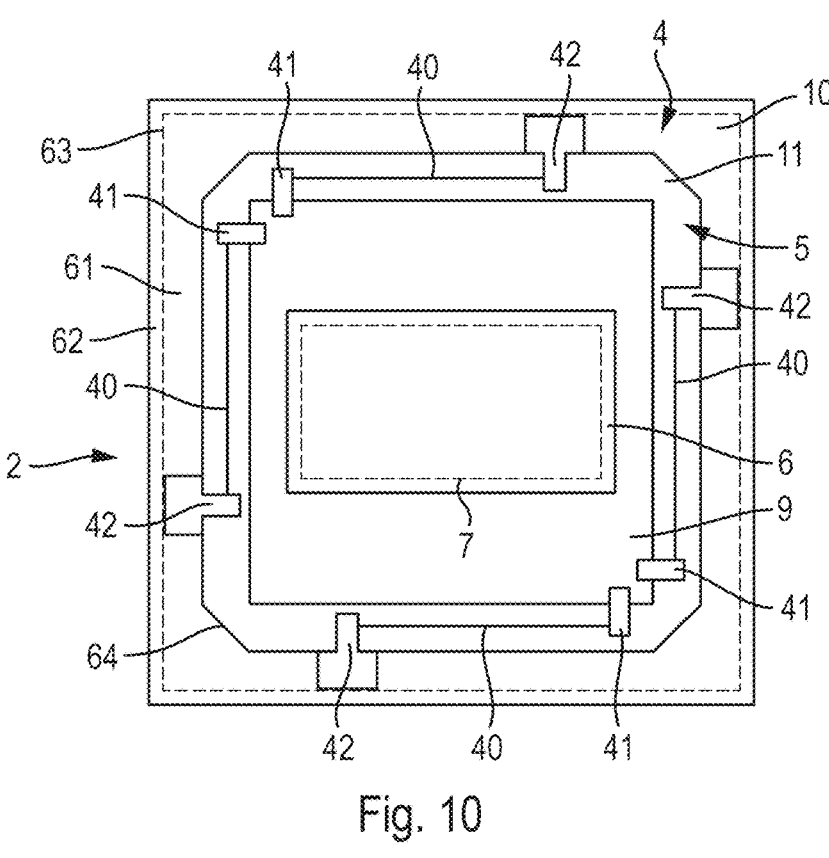
FIG. 10 is a plan view from above of a further alternative arrangement of an actuator assembly.

FIG. 10 is a plan view from above of a further alternative arrangement of an actuator assembly 2. As shown in FIG. 10, optionally the first PCB 10 comprises a first portion 61 extending in the plane and a second portion 62. The second portion 62 is angled relative to the first portion 61. For example, there may be a bend or a fold between the first portion 61 and the second portion 62. A bend line 63 is shown in FIG. 10. The bend line 63 is the inner edge line about which the bend is formed. By providing that the second portion 62 is angled relative to the plane of the first portion 61, the area taken up by the actuator assembly 2 may be reduced. From a comparison between FIG. 4 and FIG. 10 it can be seen that the area of the actuator assembly 2 shown in FIG. 10 is smaller than the area of the actuator assembly 2 shown in FIG. 4. The area referred to is the area when viewed in a direction perpendicular to the plane of the second PCB 9. The area of the surface of the first PCB 10 is not required to be reduced in order to reduce the area that the first PCB 10 takes up. By angling the second portion 62, the plan area can be reduced for a given area of surface of the first PCB 10.

Figure 11:
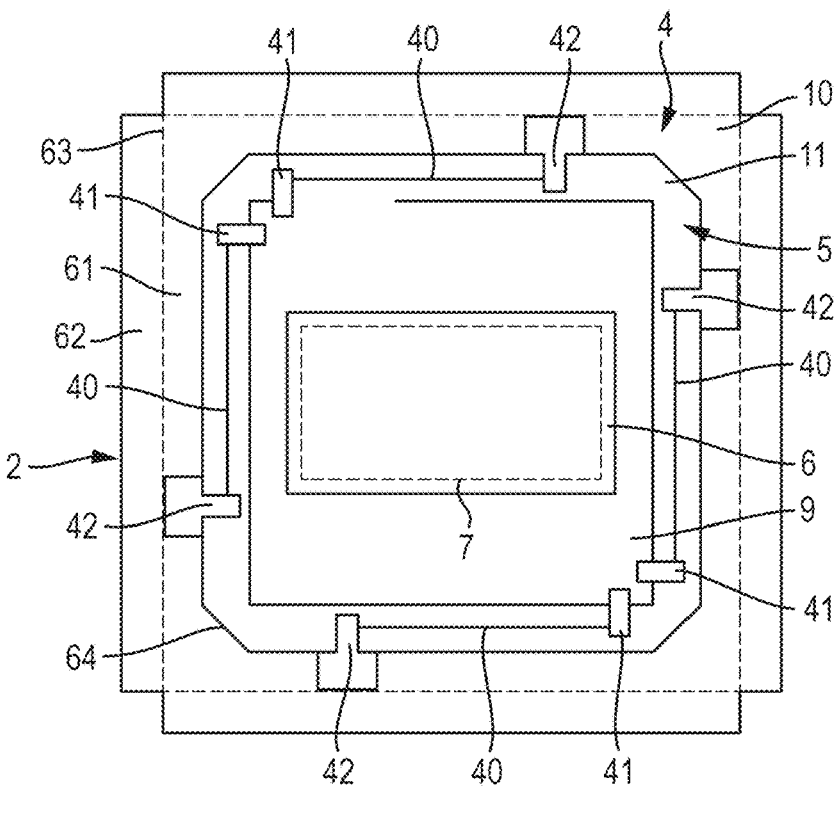
FIG. 11 is a plan view of the actuator assembly shown in FIG. 10 with an unfolded PCB.

FIG. 11 is a plan view of the actuator assembly 2 shown in FIG. 10 with an unfolded first PCB 10. FIG. 11 illustrates physical properties of the first PCB 10. The arrangement shown in FIG. 11 may not be the arrangement of an actuator assembly 2 prepared for use. The arrangement shown in FIG. 11 may be an arrangement at an intermediate stage of manufacture of the actuator assembly 2. Alternatively, the actuator assembly 2 may be made without any stage in which it is arranged as shown in FIG. 11. For example, the first PCB 10 may be bent or folded before being attached to the second PCB 9 and/or before the image sensor 6 is attached.

As shown in FIG. 11, the first PCB 10 is designed to allow part of each side of the first PCB 10 to be folded relative to the main plane of the actuator assembly 2 (i.e. the plane in which the first portion 61 of the first PCB 10 extends). The first PCB 10 may be shaped and constructed such that it can be folded out of plane. This helps to reduce the area required to fit the first PCB 10. FIG. 11 shows the first PCB 10 in its unfolded state, i.e. the state in which substantially all of the first PCB 10 is in plane. In contrast, FIG. 10 shows the first PCB 10 in its folded state. As shown in FIG. 11, optionally the first PCB 10 comprises a bend line 63. The bend line may be configured so as to facilitate bending of the first PCB 10 about the bend line 63.

As shown in FIG. 10, the second portion 62 may be formed as a tab that can be bent upwards or downwards relative to the first portion 61. In order to allow the second portions 62 of adjacent sides to be bent independently, the second portions 62 of the adjacent sides may be connected to each other only indirectly via the first portion 61. In other words, compared to the arrangement shown in FIG. 4, the external corners of the first PCB 10 may be omitted. As shown in FIG. 10 and FIG. 11, optionally the first PCB 10 comprises chamfer edges 64 at the internal corners that define the aperture 11. The chamfer edges 64 may be angled at, for example 45 degrees relative to the internal edges of the first PCB 10 that define the sides of the aperture 11. The chamfer edges 64 increase the width of the first portion 61 of the first PCB 10 available for accommodating electrical traces at the corner regions of the first PCB 10.

Figure 6:
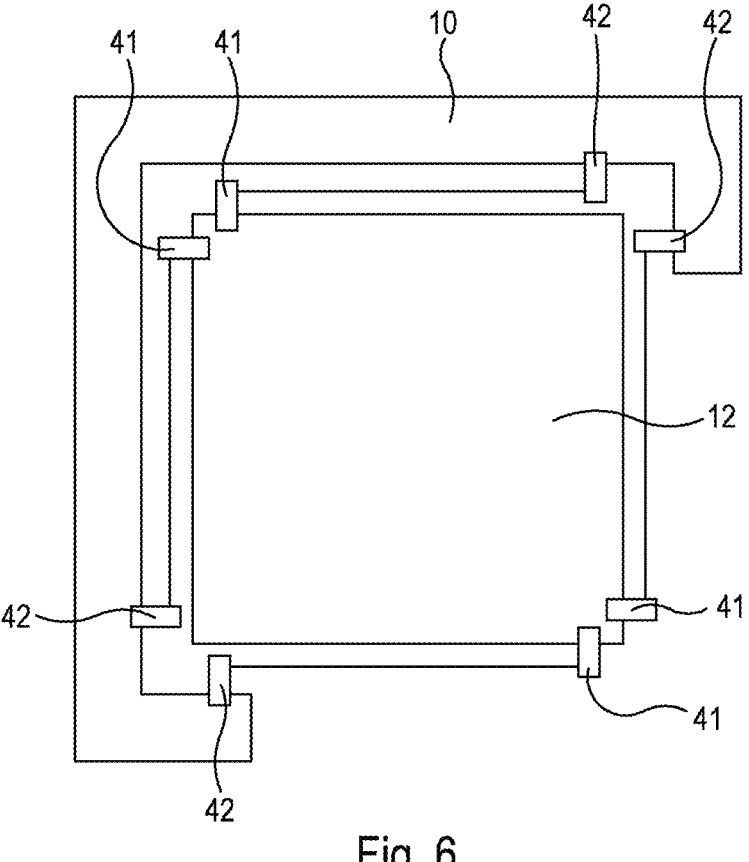
FIG. 6 is a plan view of a further alternative arrangement of an actuator assembly.

As shown in FIG. 11, optionally each of the sides of the first PCB 10 is provided with a second portion 62 for being bent out of plane. However, it is not essential for each side to be provided with such a second portion 62. In an alternative arrangement, a subset of sides (e.g. one side, two opposing side, two adjacent sides or three sides) is provided with a second portion for being angled out of plane. As shown in FIG. 6, for example, the first PCB 10 may be arranged to extend around only two (or alternatively three) sides of the second PCB 9. In such an arrangement only one or two sides may be provided with a second portion 62. By providing the second portion 62 on any side, the plan area required to accommodate a given surface length of first PCB 10 can be reduced.

As shown in FIG. 10 and FIG. 11, optionally the first portion 61 is between the second PCB 9 and the second portion 62 when viewed perpendicular to the plane in which the first portion 61 of the first PCB 10 extends. The second portion 62 is provided at an outer periphery of the first PCB 10. The second portion 62 is located radially outward of the first portion 61. The first portion 61 is provided close to (e.g. adjacent to) the second PCB 9. The second PCB 9 may be directly electrically connected to the first portion 61 of the first PCB 10. The second PCB 9 may be indirectly electrically connected to the second portion 62 of the first PCB 10 via the first portion 61 of the first PCB 10. The first portion 61 of the first PCB 10 and the second PCB 9 may be provided in similar planes which are parallel or nearly parallel and which are at a similar or the same axial location. This can help provide a stable electrical connection between the first PCB 10 and the second PCB 9.

Figure 12:
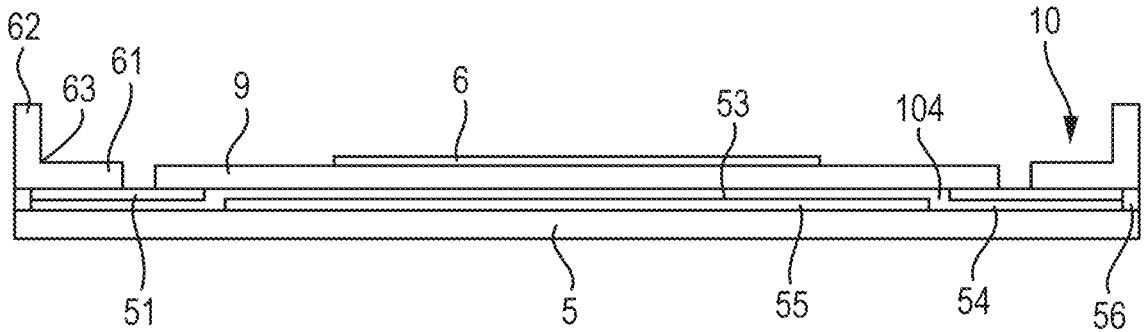
FIG. 12 is a cross-sectional view of an arrangement of the actuator assembly shown in FIG. 10.

FIG. 12 is a cross-sectional view of an arrangement of the actuator assembly 2 shown in FIG. 10. As shown in FIG. 12, optionally the second portion 62 extends perpendicular to the first portion 61. By providing that the second portion 62 is perpendicular, the second portion 62 provides a minimum contribution to the plan area taken up by the actuator assembly 2. However, it is not essential for the second portion 62 to extend perpendicularly. In an alternative arrangement the second portion 62 may extend at an oblique angle to the primary axis, for example at an angle of 45 degrees to the plane of the first portion 61.

As shown in FIG. 12, optionally the second portion 62 is angled away from the support plate 5 in a direction perpendicular to the plane in which the first portion 61 of the first PCB 10 extends. In the view shown in FIG. 12, the direction away from the support plate 5 is the upward direction. The second portion 62 is shown as being angled generally upwards. In FIG. 12 the second portion 62 is angled straight upwards (i.e. the second portion 62 is perpendicular to the first portion 61). In an alternative arrangement the second portion 62 may be angled diagonally upwards. By angling the second portion 62 upwards, the second portion 62 reaching below the support plate 5 may be avoided, which in turn avoids the possibility of requiring the support plate 5 (and the components supported on the support plate 5) to be raised so as to accommodate the second portion 62. As shown in FIG. 1, optionally the camera apparatus 1 comprises an axial actuator arrangement 24. The axial actuator arrangement 24 may be for performing autofocus, for example. Optionally the axial actuator arrangement 24, or other actuator for performing autofocus, is located on the opposite side of the image sensor 6 from the support plate 5. The autofocus actuator may be accommodated generally above the image sensor 6. Optionally the second portion 62 extends axially no further than the autofocus actuator. Hence, the bending upwards of the second portion 62 may not increase the overall height of the camera apparatus 1.

Figure 13:
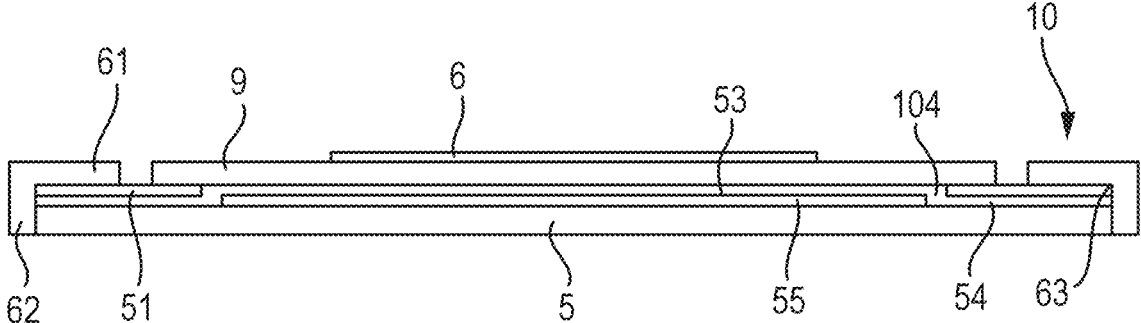
FIG. 13 is a cross-sectional view of an alternative arrangement of the actuator assembly shown in FIG. 10.

FIG. 13 is a cross-sectional view of an alternative arrangement of the actuator assembly 2 shown in FIG. 10. As shown in FIG. 13, optionally the second portion 62 is angled towards the support plate 5 in a direction perpendicular to the plane in which the first portion 61 of the first PCB 10 extends. FIG. 13 shows an alternative arrangement to that shown in FIG. 12. In FIG. 13, the second portion 62 is shown as being angled downwards whereas in FIG. 12 the second portion 62 is shown as being angled upwards. By providing that the first PCB 10 is bent downwards, the height reached by the actuator assembly 2 may be reduced. In FIG. 13 the second portion 62 is angled straight downwards (i.e. the second portion 62 is perpendicular to the first portion 61). In an alternative arrangement the second portion 62 may be angled diagonally downwards. By angling the second portion 62 diagonally (rather than vertically), the extent to which the second portion 62 extends below the first portion 61 is reduced. This may reduce the possibility of increasing the overall height of the camera apparatus 1 so as to accommodate the bent down second portion 62.

By angling the second portion 62 downwards, the first PCB 10 may function as the housing (or part of the housing) of the sensor assembly. This may help to reduce the number of different components of the actuator assembly 2, which may reduce the cost of manufacturing the actuator assembly 2. For example, the supporting wall 56 may not be required.

In FIG. 13, no spacing is shown between the radially outward end of the interconnect 51 and the second portion 62 of the first PCB 10. In an alternative arrangement the interconnect 51 may be spaced from the second portion 62 of the first PCB 10.

In a further alternative arrangement one or more sides of the first PCB 10 may have a second portion 62 angled away from the support plate 5 (e.g. upwards in the view shown in FIG. 12 or FIG. 13) and another one or more sides of the first PCB 10 may have a second portion 62 angled towards the support plate 5 (e.g. downwards).

Figure 14:
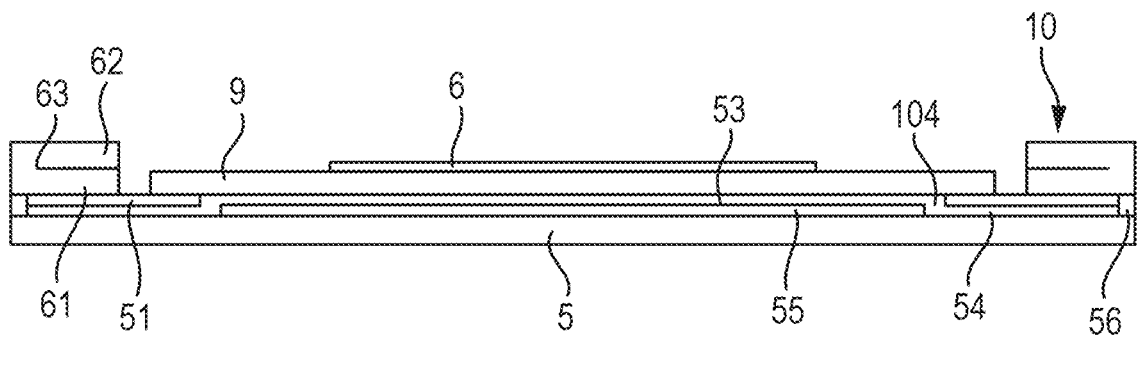
FIG. 14 is a cross-sectional view of a further alternative arrangement of an actuator assembly.

FIG. 14 is a cross-sectional view of a further alternative arrangement of an actuator assembly 2. Optionally the second portion 62 is bent by more than 90° relative to the first portion 61. As shown in FIG. 14, the second portion 62 is optionally folded back on the first portion 61 by 180°. This can help to reduce the overall height of the actuator assembly 2.

Figure 15:
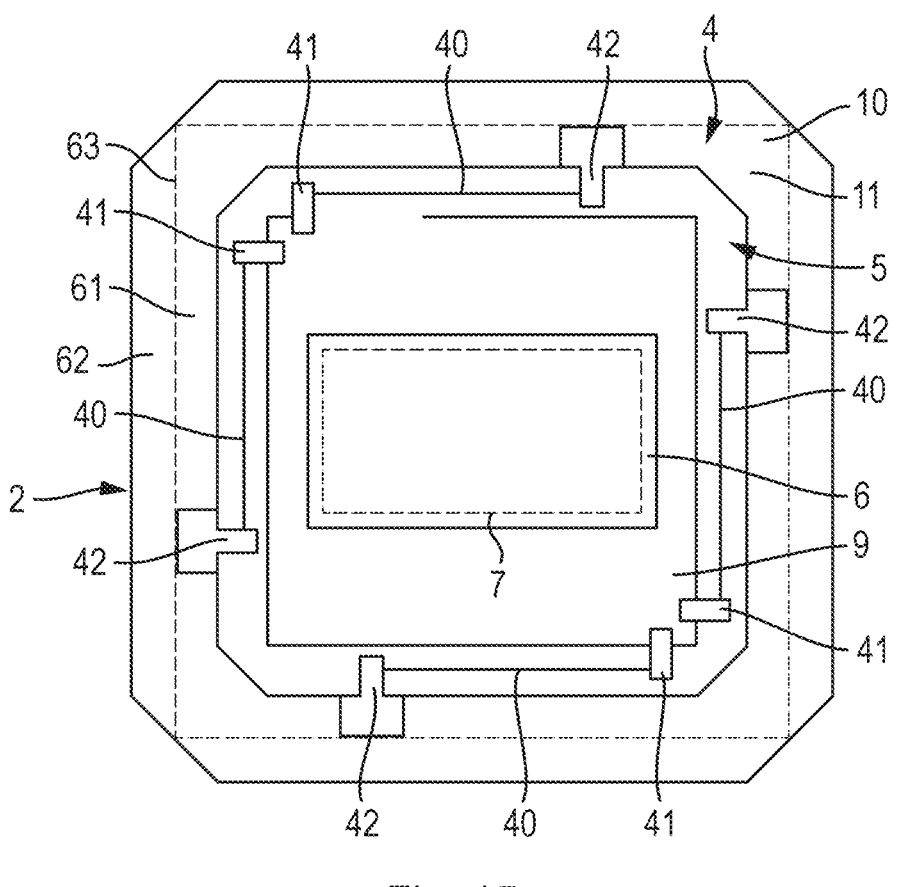
FIG. 15 is a plan view of the actuator assembly shown in FIG. 14 with an unfolded PCB.

FIG. 15 is a plan view of the actuator assembly 2 shown in FIG. 14 with an unfolded PCB. As shown in FIG. 15, optionally the unfolded tabs that form the second portion 62 have chamfered edges so that when the second portions 62 are folded over they do not overlap each other. Other features of the actuator assembly 2 shown in FIG. 15 are the same as those described with reference to FIG. 11.

Optionally at least part of the first PCB 10 is formed of a flexible printed circuit. The flexible printed circuit may comprise a bend between the first portion 61 and the second portion 62. Optionally substantially all of the first PCB 10 is formed of a flexible printed circuit. This may reduce the complexity of manufacturing the actuator assembly 2. Alternatively, at least part of (and optionally all of) the first portion 61 may be formed as a rigid PCB (i.e. not as a flexible printed circuit). This may reduce the cost of the components required to manufacture the actuator assembly 2. Optionally, part of the second portion 62 is formed as a rigid PCB. For example, the first PCB 10 may comprise rigid PCBs connected to each other via an intermediately positioned flexible printed circuit for forming the bend. In a further alternative, both the first portion 61 and the second portion 62 may be formed as rigid PCBs connected by a joint. When the first PCB 10 comprises a flexible printed circuit adjacent to a rigid PCB, the flexible printed circuit and the rigid PCB may share one or more common layers. The common layers may be formed continuously between the flexible printed circuit and the rigid PCB.

Bearing Arrangement

In the illustrated embodiments, the actuator assembly 2 further comprises a bearing arrangement 110. The bearing arrangement 110 supports the image sensor assembly 12 on the support structure 4 so as to form the gap 104. The bearing arrangement 110 allows movement of the image sensor assembly 12 relative to the support structure 4, for example in a manner allowing movement of the image sensor assembly 12 relative to the support structure 4 in any direction laterally to the light-sensitive region 7 and/or in a manner allowing rotation of the image sensor assembly 12 about any axis perpendicular to the light-sensitive region 7.

As shown in FIG. 2, the bearing arrangement may comprise a rolling bearing 110. The rolling bearing 110 may, for example, be a ball bearing or a roller bearing. The rolling bearing 110 comprising a rolling element, for example a ball or a roller. The rolling element may be spherical or may in general be any rotary element with curved surfaces that bear against the image sensor assembly 12 and the support structure 4 and are able to roll back and forth and around in operation.

The rolling element is disposed between the image sensor assembly 12 and the support structure 4. The image sensor assembly 12 is thus supported on the support structure 4 by the rolling element. The rolling bearing 110 may comprise plural rolling elements, for example three rolling elements. Although in general any number of rolling elements could be provided, it is preferable to provide at least three rolling elements to prevent relative tilting of the image sensor assembly 12 and the support structure 4. Three rolling elements are sufficient to support the image sensor assembly 12 without tilting, and the provision of three rolling elements has the advantage of easing the tolerances required to maintain point contact with each rolling element in a common plane.

In the embodiment of FIG. 2, the rolling bearing 110 is disposed on the same side of the image sensor assembly 12 as the gap 104, as shown in FIG. 2. This may ensure that the height of the gap 104 remains constant even when large forces act upon the image sensor assembly 12. The extent of the rolling element may be larger than the extent of the gap 104 in the direction perpendicular to the light-sensitive region 7, for example by way of a recess in the underside of the image sensor assembly 12 to accommodate the rolling element. This may allow the height of the gap 104 to be reduced compared to a situation in which the rolling element is arranged in the gap 104.

In an alternative embodiment, the rolling bearing 110 is disposed on the side of the image sensor assembly 12 that is opposite to the gap 104. The rolling bearing 110 is disposed on the same side of the image sensor assembly 12 as the light-sensitive region 7, in particular laterally to the light-sensitive region 7.

The bearing arrangement 110 may, alternatively or additionally, comprise a flexure arrangement. The flexure arrangement is disposed between the image sensor assembly 12 and the support structure 4. The image sensor assembly 12 is thus supported on the support structure 4 by the flexure arrangement.

Alternatively or additionally, the bearing arrangement 110 may comprise a plain bearing, such as a structured plain bearing. The plain bearing comprises a bearing surface on each of the image sensor assembly 12 and the support structure 4. The plain bearing may comprise steel, polymer or ceramic. The bearing surfaces may each be planar. The bearing surfaces bear on each other so as to support the image sensor assembly 12 on the support structure 4, permitting relative sliding motion. The plain bearing thus allows movement of the image sensor assembly 12 relative to the support structure 4, in particular in said manner allowing movement or rotation of the image sensor assembly 12 relative to the support structure 4 in any direction laterally to the light-sensitive region 7.

Additionally or alternatively, the electrical interconnector 51 may act as the bearing arrangement 110. For example, the flexures of the electrical interconnector 51 may be configured to support the image sensor assembly 12 on the support structure 4 so as to form the gap 104. The flexures are configured to allow the movement of the image sensor assembly 12 relative to the support structure 4. The image sensor assembly 12 may be suspended in space using the electrical interconnect 51. The electrical interconnect 51 comprises a flexure type arrangement configured to hold the second PCB 9 in a plane as the second PCB 9 moves to the first PCB 10. This can help to reduce friction and reduce the number of parts required to form the actuator assembly 2.

The bearing arrangement 110 is configured to constrain the image sensor 6 in a plane. This can help to improve or maintain the quality of images obtained by the image sensor 6.

Optionally, the actuator assembly 2 comprises a biasing arrangement for providing a force acting on the image sensor assembly 12 to ensure that it remains engaged with the bearing surfaces, preferably in all postures. As shown in FIG. 2, optionally the actuator assembly 2 comprises a magnet arrangement configured to apply a force biasing the image sensor assembly 12 against the bearing arrangement 110. For example, the image sensor assembly 12 may comprise at least one magnet 22. The magnets 22 may be fixed relative to the second PCB 9. The number of magnets may be one, two, three, four or more than four. The magnets 22 may be embedded in the second PCB 9, or may be attached to a side of the second PCB 9, for example.

Optionally, the support structure 4 comprises a ferrous material. For example, the support plate 5 may be formed of a ferrous material such as steel. The magnetic attraction between the magnets 22 and the support plate 5 biases the image sensor assembly 12 against the bearing arrangement 110.

Figure 8:
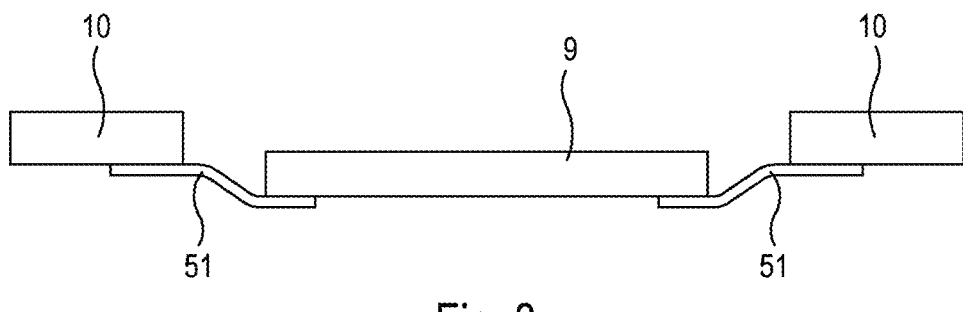
FIG. 8 is a schematic diagram illustrating how the interconnect may be used to bias the image sensor assembly against a bearing.

Optionally, the electrical interconnect 51 is preformed to provide the biasing force urging the image sensor assembly 12 against the bearing arrangement 110. For example, FIG. 8 is a schematic diagram showing how the electrical interconnect 51 may be shaped so as to provide such a biasing force. As shown in FIG. 8, optionally the flexures of the electrical interconnect 51 are formed into a particular shape before the actuator assembly 2 is assembled (i.e. before the image sensor assembly 12 is assembled with the support plate 5). For example, the flexures of the electrical interconnect 51 may comprise a jog. The electrical interconnect 51 may be formed such that the mounting position of the second PCB 9 relative to the first PCB 10 is lower (i.e. further in the direction facing away from the light sensitive region 7) than the intended position of the second PCB 9 in the actuator assembly 2 once it has been fully assembled. When the second PCB is assembled with the support plate 5, the bearing arrangement 110 may force the second PCB 9 to take its intended position. The initial shape of the flexures of the electrical interconnect 51 causes the electrical interconnect 51 to apply a spring force urging the image sensor assembly 12 onto the bearing arrangement 110.

Actuator Arrangement

Movement of the image sensor assembly 12 relative to the support structure 4 is driven by an actuator arrangement that is arranged as follows, and seen most easily in FIG. 4. Particular advantage is achieved in the case that the actuator arrangement comprises plural SMA wires 40, as SMA provides a high actuation force compared to other forms of actuator. This may assist in accurate positioning of the image sensor assembly 12 relative to the support structure 4. In general, however, the actuator arrangement may comprise actuator components other than SMA wires 40.

The actuator arrangement shown in FIG. 4 is formed by a total of four SMA wires connected between the support structure 4 and the image sensor assembly 12. For attaching the SMA wires 40, the image sensor assembly 12 comprises crimp portions 41 fixed to the second PCB 9 and the support structure 4 comprises crimp portions 42 fixed to the first PCB 10. The crimp portions 41 and 42 crimp the four SMA wires 40 so as to connect them to the support structure 4 and the image sensor assembly 12.

As shown in FIGS. 4 and 6, for example, optionally the SMA wires 40 are fixed to the first PCB 10 and the second PCB 9. The crimp portions 41 may be mounted directly onto the second PCB 9. The crimp portions 42 may be mounted directly onto the first PCB 10.

The SMA wires 40 are arranged as follows so that they are capable, on selective driving, of moving the image sensor assembly 12 relative to the support structure 4 in any direction laterally to the light-sensitive region 7 and also of rotating the image sensor assembly 12 about an axis orthogonal to the light-sensitive region 7.

In use, each of the SMA wires 40 is held in tension, thereby applying a force between the support structure 4 and the image sensor assembly 12.

The SMA wires 40 may be perpendicular to the optical axis O so that the force applied to the image sensor assembly 12 is lateral to the light-sensitive region 7. Alternatively, the SMA wires 40 may be inclined at a small angle to the light-sensitive region 7 so that the force applied to the image sensor assembly 12 includes a component lateral to the light-sensitive region 7 and a component along the optical axis O that acts as a biasing force that biases the image sensor assembly 12 against the bearing arrangement 110. So, the SMA wires 40 may act as the biasing arrangement. The biasing arrangement may comprise actuator components for applying a biasing force that biases the image sensor assembly 12 towards the bearing arrangement 110.

The overall arrangement of the SMA wires 40 will now be described, being similar to that described in WO-2014/083318.

SMA material has the property that on heating it undergoes a solid-state phase change which causes the SMA material to contract. At low temperatures, the SMA material enters the Martensite phase. At high temperatures, the SMA enters the Austenite phase which induces a deformation causing the SMA material to contract. The phase change occurs over a range of temperature due to the statistical spread of transition temperature in the SMA crystal structure. Thus heating of the SMA wires 40 causes them to decrease in length.

The SMA wires 40 may be made of any suitable SMA material, for example Nitinol or another Titanium-alloy SMA material. Advantageously, the material composition and pre-treatment of the SMA wires 40 is chosen to provide phase change over a range of temperature that is above the expected ambient temperature during normal operation and as wide as possible to maximise the degree of positional control.

On heating of one of the SMA wires 40, the stress therein increases and it contracts, causing movement of the image sensor assembly 12. A range of movement occurs as the temperature of the SMA increases over the range of temperature in which there occurs the transition of the SMA material from the Martensite phase to the Austenite phase. Conversely, on cooling of one of the SMA wires 40 so that the stress therein decreases, it expands under the force from opposing ones of the SMA wires 40. This causes the image sensor assembly 12 to move in the opposite direction.

The image sensor assembly 12 is positioned axially within the aperture 11 of the first PCB 10 of the support structure 4. The four SMA wires 40 are arranged on four sides of the image sensor assembly 12. The SMA wires 40 may be of the same length and may have a rotationally symmetrical arrangement.

As viewed axially, a first pair of the SMA wires 40 extend parallel to a first axis (vertical in FIG. 4) that is lateral to the light-sensitive region 7. However, the first pair of the SMA wires 40 are oppositely connected to the support structure 4 and the image sensor assembly 12 so that they apply forces in opposite directions along the first axis (vertically up and down in FIG. 4). The forces applied by the SMA wires 40 of the first pair balance in the event that the tension in each SMA wire 40 is equal. This means that the first pair of the SMA wires 40 apply a first torque to the image sensor assembly 12 (anti-clockwise in FIG. 4).

As viewed axially, a second pair of SMA wires 40 extend parallel to a second axis (horizontal in FIG. 4) that is lateral to the light-sensitive region 7. However, the second pair of SMA wires 40 are oppositely connected to the support structure 4 and the image sensor assembly 12 so that they apply forces in opposite directions along the second axis (horizontally left and right in FIG. 4). The forces applied by the SMA wires 40 of the second pair balance in the event that the tension in each SMA wire 40 is equal. This means that the second pair of the SMA wires 40 apply a second torque (clockwise in FIG. 4) to the image sensor assembly 12 that is arranged to be in an opposite sense to the first torque. Thus, the first and second torques balance in the event that tension in each SMA wire 40 is the same.

As a result, the SMA wires 40 may be selectively driven to move the image sensor assembly 12 in any direction laterally relative to the optical axis O and to rotate the image sensor assembly 12 about an axis parallel to the optical axis O. That is:

movement of the image sensor assembly 12 in either direction along the first axis may be achieved by driving the first pair of SMA wires 40 to contract differentially, due to them applying forces in opposite directions;

movement of the image sensor assembly 12 in either direction along the second axis may be achieved by driving the second pair of SMA wires 40 to contract differentially, due to them applying forces in opposite directions; and rotation of the image sensor assembly 12 may be achieved by driving the first pair of SMA wires 40 and the second pair of SMA wires 40 to contract differentially, due to the first and second torques being in opposite senses.

The magnitude of the range of movement and rotation depends on the geometry and the range of contraction of the SMA wires 40 within their normal operating parameters.

This particular arrangement of the SMA wires 40 is advantageous because it can drive the desired lateral movement and rotation with a minimum number of SMA wires. However, other arrangements of SMA wires 40 could be applied. To provide three degrees of motion (two degrees of lateral motion and one degree of rotational motion), then a minimum of four SMA wires 40 are provided. Other arrangements could apply a different number of SMA wires 40. Less SMA wires 40 could be provided for lateral motion, but not rotation. Arrangements with more than four SMA wires 40 are also possible, and may have advantages in allowing additional parameters to be controlled in addition to motion, for example the degree of stress in the SMA wires 40.

The lateral position and orientation of the image sensor assembly 12 relative to the support structure 4 is controlled by selectively varying the temperature of the SMA wires 40. This driving of the SMA wires 40 is achieved by passing selective drive signals through the SMA wires 40 to provide resistive heating. Heating is provided directly by the current of the drive signals. Cooling is provided by reducing or ceasing the current of the drive signals to allow the SMA wire 40 to cool by conduction, convection and radiation to its surroundings.

Camera Apparatus

The camera apparatus 1 comprises a lens assembly 20 that is assembled with the actuator assembly 2 by being mounted to the support structure 4, for example to the rim portion formed at least partly by the first PCB 10.

The lens assembly 20 comprises a lens carriage 21 in the form of a cylindrical body that is mounted to the rim portion of the support structure 4. The lens carriage supports at least one lens arranged along the optical axis O. In general any number of one or more lenses may be provided. Without limitation to the invention, in this example the camera apparatus 1 is a miniature camera in which the at least one lens (i.e. each lens if plural lenses are provided) typically have a diameter of at most 10 mm or 15 mm or 20 mm. The at least one lens of the lens assembly 20 is arranged to focus an image onto the image sensor.

In this example, at least one lens is supported on the lens carriage 21 in a manner in which at least one lens is movable along the optical axis O relative to the lens carriage 21, for example to provide focusing or zoom, although that is not essential. In particular, the at least one lens is fixed to a lens holder 23 which is movable along the optical axis O relative to the lens carriage 21. Where there are plural lenses, any or all of the lenses may be fixed to the lens holder 23 and/or one or more of the lenses may be fixed to the lens carriage 21 and so not movable along the optical axis O relative to the lens carriage 21.

An axial actuator arrangement 24 provided between the lens carriage 21 and the lens holder 23 is arranged to drive movement of the lens holder 21 and lenses along the optical axis O relative to the lens carriage 21. The axial actuator arrangement 24 may be any suitable type, for example being a voice coil motor (VCM) or an arrangement of SMA wires, such as is described in WO-2019/243849 which is incorporated herein by reference.

In addition, the camera apparatus 1 may comprise a can 15 fixed to the support structure 4 and protruding forwardly therefrom to encase and protect the other components of the camera apparatus 1.

As discussed above, in operation the SMA wires 40 are selectively driven to move the image sensor assembly 12 in any direction laterally and/or to rotate the image sensor assembly 12 about an axis parallel to the optical axis O. This is used to provide OIS, compensating for image movement of the camera apparatus 1, caused by for example handshake.

Relative movement of the image sensor 6 relative to the support structure 4 and hence also relative to the lens assembly 20 may be used to stabilise the image against tilting of the camera apparatus 1, i.e. rotation about axes extending laterally to the light-sensitive region 7. In addition, rotation of the image sensor 6 may be used to stabilise the image against rotation of the camera apparatus 1 around the optical axis O.

The SMA wires 40 are driven by the control circuit implemented in the IC chip 30. In particular, the control circuit generates drive signals for each of the SMA wires 40 and supplies the drive signals to the SMA wires 40.

The control circuit 30 receives the output signals of the gyroscope sensor 31 which acts as a vibration sensor. The gyroscope sensor 31 detects the vibrations that the camera apparatus 1 is experiencing and its output signals represent those vibrations, specifically as the angular velocity of the camera lens element 20 in three dimensions. More generally, larger numbers of gyroscopes or other types of vibration sensor could be used.

The drive signals are generated by the control circuit in response to the output signals of the gyroscope sensor 31 so as to drive movement of the image sensor assembly 12 to stabilise an image focused by the camera lens element 20 on the image sensor, thereby providing OIS. The drive signals may be generated using a resistance feedback control technique for example as disclosed in any of WO-2013/175197, WO-2014/076463, WO-2012/066285, WO-2012/020212, WO-2011/104518, WO-2012/038703, WO-2010/089529 or WO-2010/029316, each of which is incorporated herein by reference.

The camera apparatus 1 may be incorporated into a portable electronic device, such as such as a mobile telephone or tablet computer.

Variations

It will be appreciated that there may be many other variations of the above-described embodiments. Features of the different arrangements shown in the Figures may be combined with each other. For example, the region of material 55 shown in FIG. 5 may be applied to the actuator assembly 2 shown in FIG. 2, FIG. 7 or FIG. 9. The region of material 57 shown in FIG. 7 may be applied to the actuator assembly 2 shown in FIG. 2, FIG. or FIG. 9 (in which case the region of material 57 may be attached to the sensor support member 58). The L-shaped first PCB 10 shown in FIG. 6 may be applied to the actuator assembly 2 shown in the other Figures.

The bearing arrangement 110 may comprise any combination of the above-described bearing arrangements 110. The roller bearing 110 may comprise rolling elements on both sides of the image sensor assembly 12 in a direction perpendicular to the light-sensitive region 7. The bearing arrangement 110 may comprise one or more rolling bearings and one or more flexure arrangements.

As shown in FIGS. 3 and 4, optionally the first PCB 10 extends along at least two edges of the second PCB 9. In the arrangement shown in FIGS. 3 and 4, the first PCB 10 extends along all four sides of the second PCB 9. The first PCB 10 may surround the second PCB 9 in the plane in which the first PCB 10 extends. An aperture 11 is provided in the first PCB 10. The second PCB 9 is located within the aperture 11.

However, it is not essential for the first PCB to surround the second PCB 9. The first PCB 10 may comprise an opening such that it does not fully encircle the second PCB 9. FIG. 6 is a plan view of an alternative arrangement of the first PCB 10 relative to the image sensor assembly 12.

As shown in FIG. 6, optionally the first PCB 10 extends around only two edges of the image sensor assembly 12. The first PCB 10 forms an L-shape. The first PCB 10 does not have a hole for the second PCB 9. Instead, the first PCB 10 is positioned adjacent to the second PCB 9 in an L-shape. Although not shown in FIG. 6, the second PCB 9 may optionally extend to use the space on the two sides where the first PCB 10 does not extend around the second PCB 9. This may provide more area on the second PCB 9 for mounting components, for example. As shown in FIG. 6, the first PCB 10 is arranged to accommodate the locations of the crimp portions 42. As shown in FIG. 6, the crimp portions 42 may be provided close to the corners of the image sensor assembly 12. This reduces the required lateral extent of the first PCB 10 in order to accommodate the crimp portions 42.

As an alternative to, or in addition to, the metallic flexures described above, the electrical interconnector 51 may comprise, for example, one or more flexible printed circuits (also known as flex circuits), one or more interconnect that have a flexible metallic substrate carrying e.g. an insulating layer and then one or more conductive tracks, etc.

The actuator assembly 2 may include an electronic component other than an image sensor 6. For example, the actuator assembly 2 may be configured to move an electronic assembly comprising an (active) part of a head-mounted display.

It is not essential for there to be an overlap between the first PCB 10 and the second PCB 9 in the direction along the primary axis. In an alternative arrangement, the first PCB and the second PCB 9 do not overlap. Nevertheless, the thermal path between the image sensor 6 and the support structure 4 may be reduced by not requiring the first PCB to be positioned between the image sensor 6 and the support plate 5. The first PCB 10 and the second PCB 9 may be arranged such that they do not overlap when viewed in a direction along the primary axis of the actuator assembly 2.

SMA Wire

The above-described SMA actuator assemblies comprise an SMA wire. The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The invention claimed is:

1. An actuator assembly comprising:
   a support structure comprising a first printed circuit board (PCB);
   an image sensor assembly comprising a second PCB and an image sensor having a light-sensitive region, wherein the image sensor assembly is supported on the support structure to allow movement of the image sensor assembly relative to the support structure;
   an electrical interconnector configured to electrically connect the first PCB to the second PCB, wherein the first PCB and the second PCB overlap when viewed along at least one direction in the plane in which the first PCB extends;
   a bearing arrangement configured to support the image sensor assembly on the support structure, wherein:
      the bearing arrangement is configured to allow the movement of the image sensor assembly relative to the support structure; and
      the bearing arrangement comprises a plain bearing or a rolling bearing comprising a rolling element disposed between the image sensor assembly and the support structure;
   wherein the electrical interconnector is configured to apply a force biasing the image sensor assembly against the bearing arrangement.

2. The actuator assembly of claim 1, wherein the first PCB extends along at least two edges of the second PCB.

3. The actuator assembly of claim 2, wherein the first PCB surrounds the second PCB in the plane in which the first PCB extends.

4. The actuator assembly of claim 1, wherein the length of overlap between the first PCB and the second PCB is at least half the thickness of the first PCB and/or the second PCB in a direction perpendicular to the plane in which the first PCB extends.

5. The actuator assembly of claim 1, wherein the electrical interconnector is located at the side of the image sensor assembly facing away from the light-sensitive region.

6. The actuator assembly of claim 1, wherein the electrical interconnector comprises a plurality of metallic flexures generally extending in a plane parallel to the plane in which the first PCB extends.

7. The actuator assembly of claim 1, comprising an actuator arrangement capable of moving the image sensor assembly relative to the support structure in any direction parallel to the plane in which the light-sensitive region extends and/or rotating the image sensor assembly about an axis orthogonal to the plane in which the light-sensitive region extends, wherein the actuator arrangement comprises a plurality of shape memory alloy wires arranged, on contraction, to move the image sensor assembly relative to the support structure.

8. The actuator assembly of claim 1, wherein the electrical connection between the image sensor and the electrical interconnector is at least partly formed by the second PCB.

9. The actuator assembly of claim 1, wherein the second PCB comprises electronic components configured to act on signals output by the image sensor.

10. The actuator assembly of claim 1, wherein the image sensor assembly is supported on the support structure such that a gap is formed between the image sensor assembly and the support structure on a side of the image sensor assembly facing away from the light-sensitive region.

11. An actuator assembly comprising:

a support structure comprising a first printed circuit board, PCB;

an image sensor assembly comprising a second PCB and an image sensor having a light-sensitive region, wherein the image sensor assembly is supported on the support structure to allow movement of the image sensor assembly relative to the support structure;

an electrical interconnector configured to electrically connect the first PCB to the second PCB;

wherein the first PCB and the second PCB overlap when viewed along at least one direction in the plane in which the first PCB extends;

a bearing arrangement configured to support the image sensor assembly on the support structure, wherein the bearing arrangement is configured to allow the movement of the image sensor assembly relative to the support structure, where the bearing arrangement comprises a plain bearing or a rolling bearing comprising a rolling element disposed between the image sensor assembly and the support structure; and a magnet arrangement configured to apply a force biasing the image sensor assembly against the bearing arrangement.

12. The actuator assembly of claim 11, wherein the first PCB extends along at least two edges of the second PCB.

13. The actuator assembly of claim 12, wherein the first PCB surrounds the second PCB in the plane in which the first PCB extends.

14. The actuator assembly of claim 11, wherein the length of overlap between the first PCB and the second PCB is at least half the thickness of the first PCB and/or the second PCB in a direction perpendicular to the plane in which the first PCB extends.

15. The actuator assembly of claim 11, wherein the electrical interconnector is located at the side of the image sensor assembly facing away from the light-sensitive region.

16. The actuator assembly of claim 11, wherein the electrical interconnector comprises a plurality of metallic flexures generally extending in a plane parallel to the plane in which the first PCB extends.

17. The actuator assembly of claim 11, comprising an actuator arrangement capable of moving the image sensor assembly relative to the support structure in any direction parallel to the plane in which the light sensitive region extends and/or rotating the image sensor assembly about an axis orthogonal to the plane in which the light-sensitive region extends, wherein the actuator arrangement comprises plural shape memory alloy, SMA, wires arranged, on contraction, to move the image sensor assembly relative to the support structure.

18. The actuator assembly of claim 11, wherein the electrical connection between the image sensor and the electrical interconnector is at least partly formed by the second PCB.

19. The actuator assembly of claim 11, wherein the second PCB comprises electronic components configured to act on signals output by the image sensor.

20. The actuator assembly of claim 11, wherein the image sensor assembly is supported on the support structure such that a gap is formed between the image sensor assembly and the support structure on a side of the image sensor assembly facing away from the light-sensitive region.

* * * * *